(12) United States Patent
Oberheim

(10) Patent No.: US 8,230,605 B2
(45) Date of Patent: Jul. 31, 2012

(54) SHOCK ABSORBING, VIBRATION ISOLATING AND JAM PROTECTING FOOT DEVICE FOR A RECIPROCATING SAW

(75) Inventor: Stephen C. Oberheim, Des Plaines, IL (US)

(73) Assignee: Robert Bosch GmbH, Stuttgart (DE)

( * ) Notice: Subject to any disclaimer, the term of this patent is extended or adjusted under 35 U.S.C. 154(b) by 429 days.

(21) Appl. No.: 12/559,598

(22) Filed: Sep. 15, 2009

(65) Prior Publication Data

US 2011/0061245 A1    Mar. 17, 2011

(51) Int. Cl.
*B27B 3/12*    (2006.01)
(52) U.S. Cl. .............................. 30/376; 30/392
(58) Field of Classification Search .............. 30/392, 30/393, 286, 289, 374, 375, 376, 377; 173/30, 173/210
See application file for complete search history.

(56) References Cited

U.S. PATENT DOCUMENTS

| 4,334,356 A | 6/1982 | Krosunger |
| 5,007,172 A * | 4/1991 | Palm ................................ 30/377 |
| 5,566,458 A | 10/1996 | Bednar |
| 5,607,023 A | 3/1997 | Palm |
| 5,697,456 A | 12/1997 | Radle et al. |
| 5,927,427 A | 7/1999 | Sewell et al. |
| 6,317,988 B1 * | 11/2001 | Tachibana et al. .............. 30/376 |
| 6,484,409 B2 | 11/2002 | Campbell et al. |
| 6,550,147 B1 | 4/2003 | Fishlock et al. |
| 6,691,417 B2 | 2/2004 | Campbell et al. |
| 7,971,362 B2 * | 7/2011 | Haas et al. ...................... 30/377 |
| 2005/0016001 A1 | 1/2005 | Griep et al. |
| 2005/0087353 A1 * | 4/2005 | Oki et al. .................... 173/162.2 |
| 2005/0102846 A1 | 5/2005 | Breazeale, Jr. |
| 2009/0151174 A1 * | 6/2009 | Steingruber et al. ............ 30/394 |

FOREIGN PATENT DOCUMENTS

EP    1666182    6/2006

* cited by examiner

*Primary Examiner* — Kenneth E. Peterson
*Assistant Examiner* — Jennifer Swinney
(74) *Attorney, Agent, or Firm* — Greer, Burns & Crain Ltd.

(57) ABSTRACT

Embodiments of a foot apparatus for use with a power reciprocating saw having a nose portion configured to receive the same, the apparatus comprising an elongated foot stem configured to be inserted into the nose portion of the saw a foot pad having a forward surface for contacting a work piece and having an opening through which a blade extends, a front housing having one end portion with a first pivot connection to the stem and an opposite end portion having a second pivot connection to the foot pad, a compliant element interposed between one of the foot pad and front housing and the stem configured to resist pivoting of the front housing relative to the stem and thereby isolate and dampen vibration and shock that is transmitted to the stem by reciprocating action of the plunger and by cutting of a work piece.

19 Claims, 9 Drawing Sheets

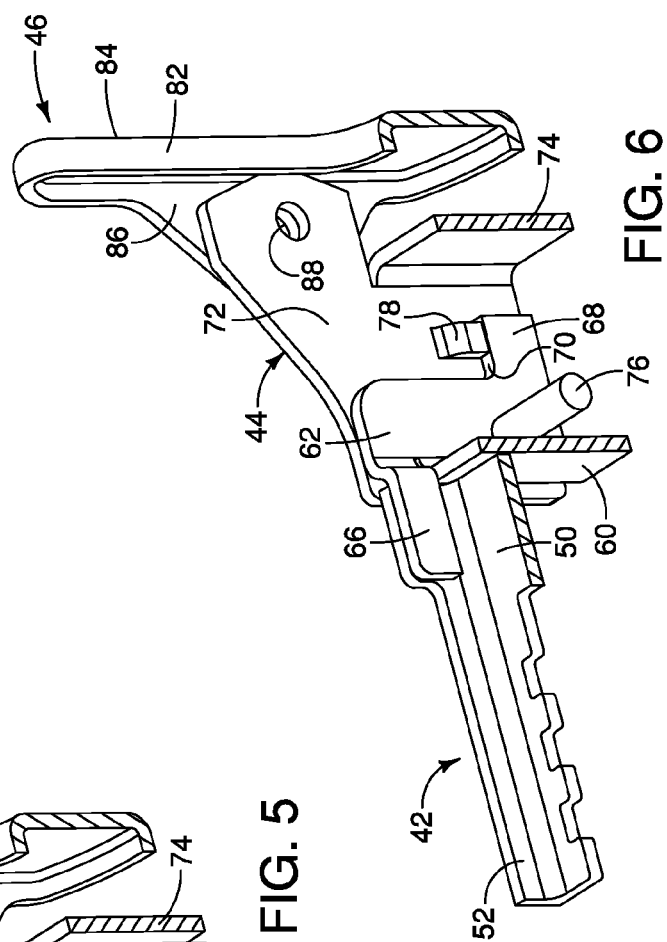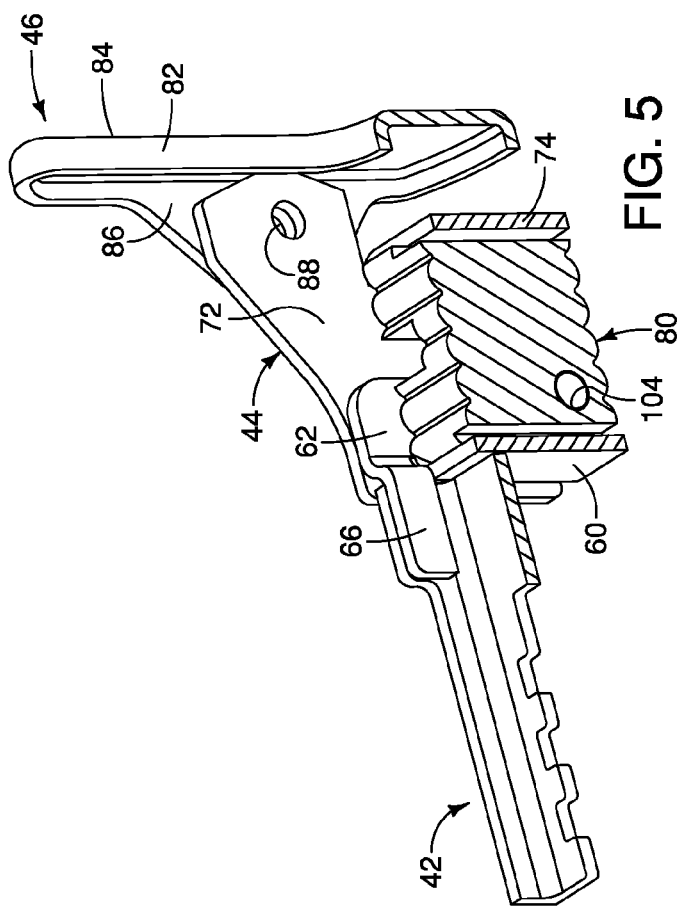

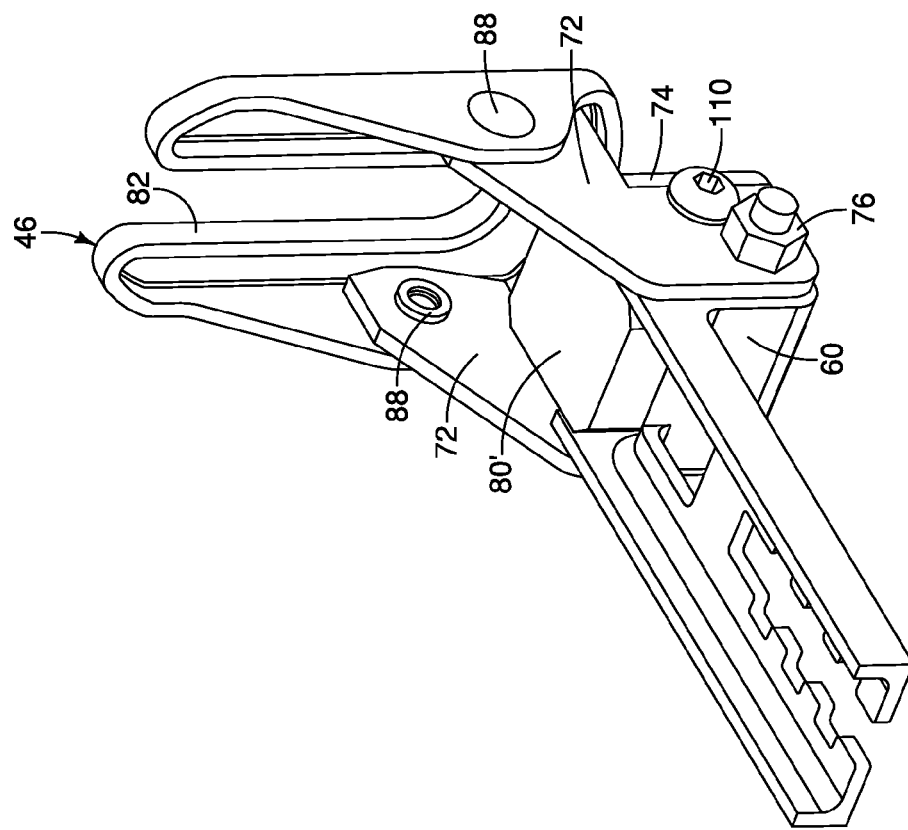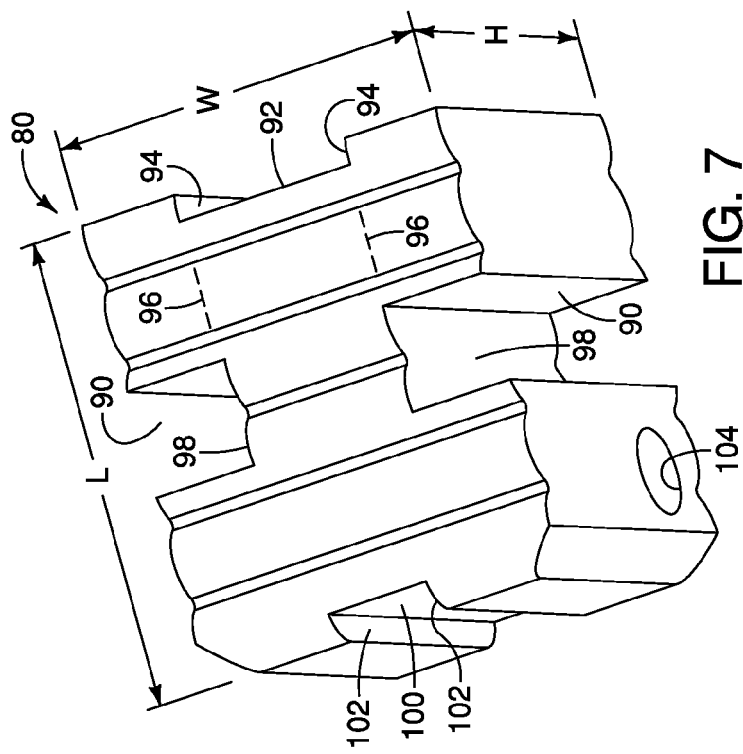

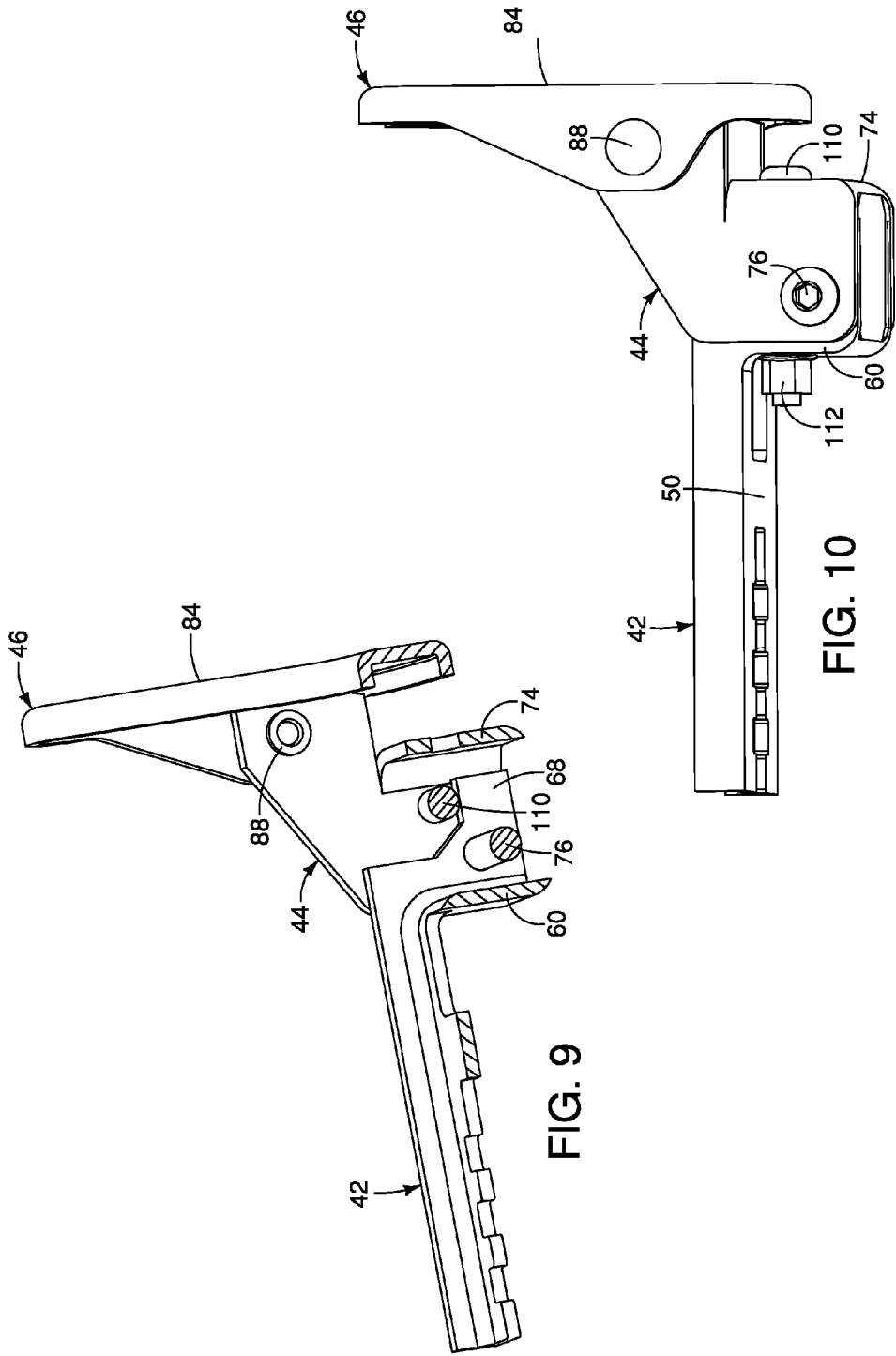

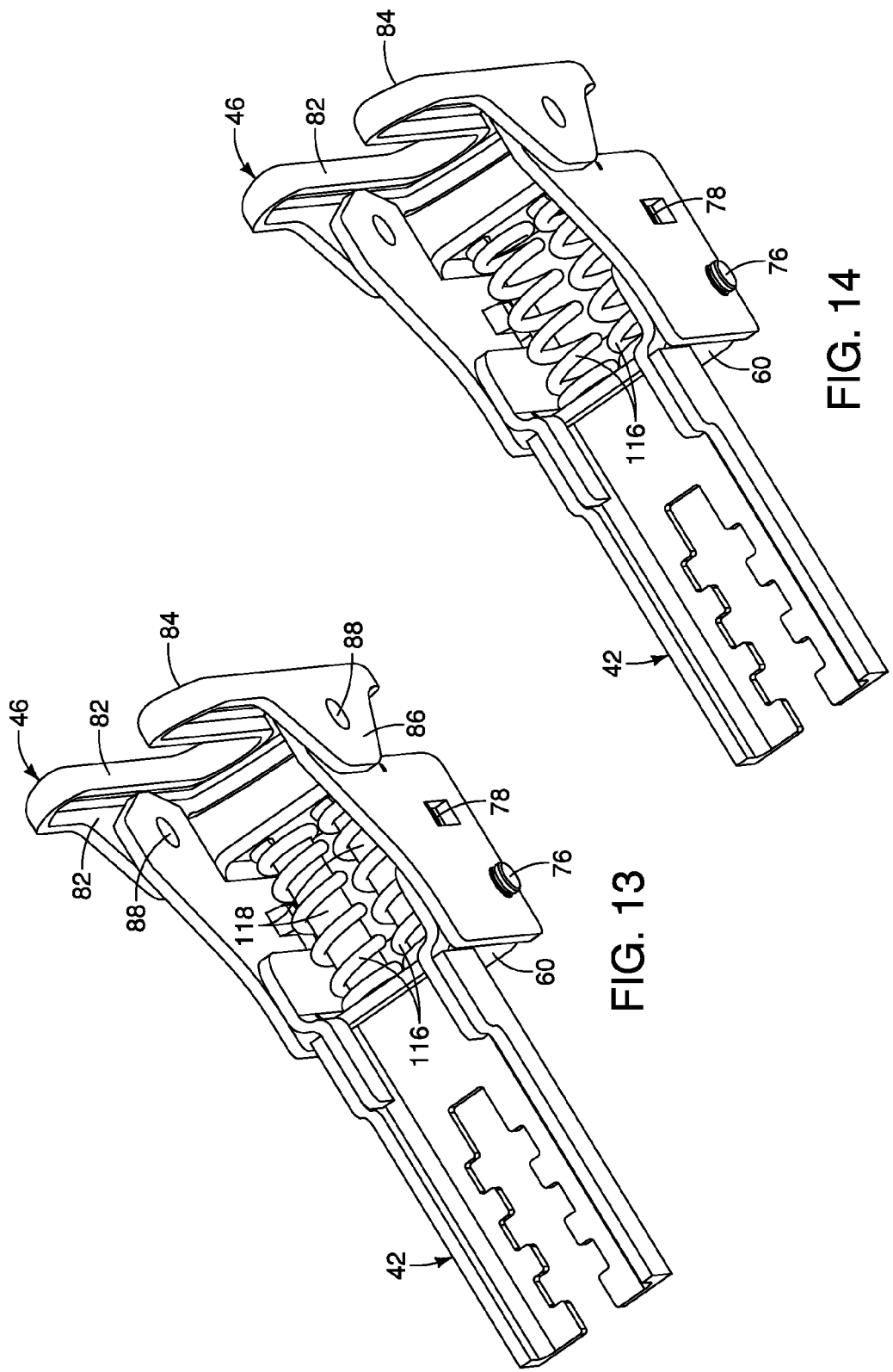

SHOCK ABSORBING, VIBRATION ISOLATING AND JAM PROTECTING FOOT DEVICE FOR A RECIPROCATING SAW

BACKGROUND OF THE INVENTION

Power saws that have a reciprocating blade are used by artisans in the construction and remodeling industries, as well as many other industries, to perform demolition and other heavy duty cutting tasks. Many commercially available reciprocating saws are quite powerful and are effective to make difficult cuts through many kinds of materials and combinations of materials, such as are encountered during demolition tasks. The fact that many saws are quite powerful makes them difficult as well as uncomfortable to operate, in large part because of excessive hand-arm vibration that is experienced by the user. In the case of the blade jamming, substantial shock can be produced, which can be dangerous to the user as well as potentially damaging to the internal gear train and even the motor of the saw.

SUMMARY OF THE INVENTION

Embodiments of a foot apparatus for use with a power reciprocating saw having a nose portion configured to receive the same and an elongated reciprocating plunger configured to hold a cutting blade that extends outwardly beyond the apparatus, the apparatus comprising an elongated foot stem configured to be inserted into the nose portion of the saw a foot pad having a forward surface for contacting a work piece and having an opening through which a blade extends, a front housing having one end portion with a first pivot connection to the stem and an opposite end portion having a second pivot connection to the foot pad, the first and second pivot connections being offset from one another in a transverse direction relative to the longitudinal direction of the plunger to thereby define a moment arm, a compliant element interposed between one of the foot pad and front housing and the stem configured to resist pivoting of the front housing relative to the stem and thereby isolate and dampen vibration and shock that is transmitted to the stem by reciprocating action of the plunger and by cutting of a work piece.

DESCRIPTION OF THE DRAWINGS

FIG. 5 is a cross-sectional view of the embodiment shown in FIG. 4;

FIG. 6 is a view similar to FIG. 5, but having the elastomeric block removed to show details of the construction;

FIG. 7 is a perspective view of the elastomeric block shown in FIGS. 3, 4 and 5;

FIG. 8 is a perspective view of a second preferred embodiment of an isolation system;

FIG. 9 is a cross-sectional view of the second embodiment shown in FIG. 8, with the elastomeric block removed to show details of the construction;

FIG. 10 is a perspective view of a third preferred embodiment of an isolation system;

FIG. 13 is a perspective view showing a fifth preferred embodiment of an isolation system; and FIG. 14 is a perspective view of a sixth preferred embodiment of an isolation system.

DETAILED DESCRIPTION

Figure 1:
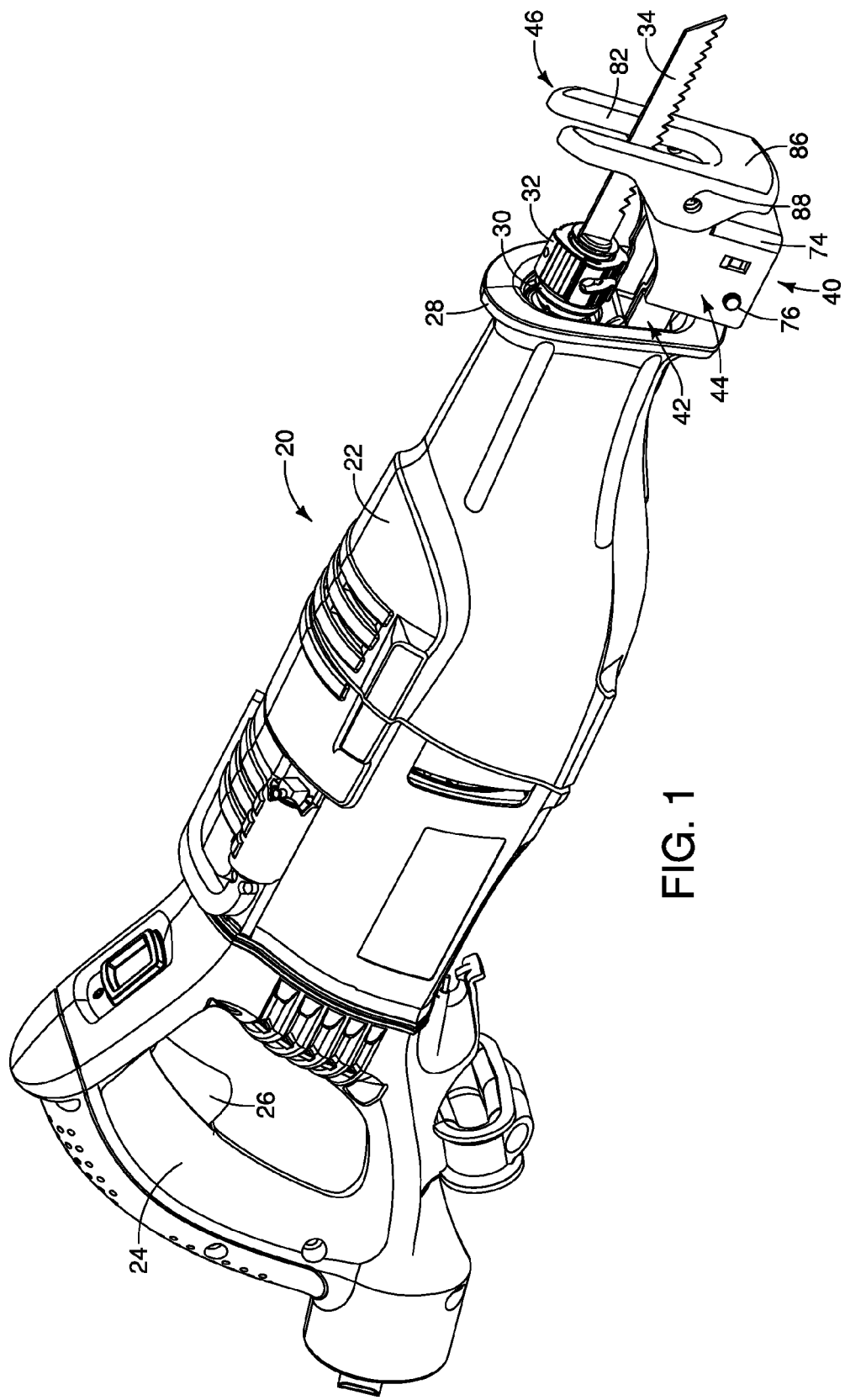
FIG. 1 is a perspective view illustrating a preferred embodiment of an isolation system of the present invention shown installed in a reciprocating saw.

Embodiments of the present invention are directed to an isolation system that is a part of a foot structure of a reciprocating saw. The isolation system has a compliant element which provides shock and vibration absorption, vibration isolation, and jam load protection.

More particularly, because the isolation system is located on the foot and not in the tool front housing, it is located in an unused part of the tool, and there is more room to use a generous amount of isolator material. This allows more shock absorption since there is more shock absorbing material. Having the system in the foot does not require any increase the size of the saw, nor is the overall size of the foot increased. Also because the isolator is relatively large, there is little chance of the material bottoming out, which can cause the shock levels to actually increase. Since the isolator/absorber is entirely mounted in the foot, it can easily be retrofitted onto previously sold saws.

Embodiments of the invention have a pre-compression feature which reduces vibration and shock that could be caused by looseness of components of the apparatus. Also, because the apparatus is designed to be part of the foot, it is not affected by the temperature inside the tool. This avoids the problem of heating the elastomer, which when heated, usually softens it, changing its hardness and isolation properties. The difficulty of maintaining the proper isolation properties over a wide range of temperatures is avoided.

Since the isolation system acts to reduce shock and vibration transmitted to the saw, it acts to reduce hand-arm vibration experienced by the user. It reduces vibration in both the front and the back handle, and also acts to protect the saw mechanism from excessively high forces during jams.

The location of this isolation system in the foot is in a previously unused place on the reciprocating saw and therefore has no effect on the size of the reciprocating saw. It advantageously has a large complaint element absorber that is an elastomeric block in preferred embodiment. The large size allows it to be a much more effective shock absorber and vibration isolator, and because it is advantageously large, it does not suffer from bottoming out easily. Bottoming out can actually increase shock and vibration.

Also, because the saw foot now has a compliant structural element, during blade jams, this element can deflect and thereby reduce impact loading on the mechanism, thus extending tool life.

Thus, embodiments of the present invention are directed to a reciprocating saw foot mounted isolator/absorber system that provides shock and vibration absorption, vibration isolation, and mechanism jam load protection. This isolator is an integral part of the saw foot, and incorporates a compliant element attached to the rigid parts of the foot. This compliant element allows motion to occur in a manner similar to a spring and damper, acting to isolate vibration, absorb shock, and prevent damage to the saw mechanism during jam conditions.

Another function that this isolation/absorber foot system provides is that of jam protection for the saw mechanism. A jam occurs when the saw blade become pinched in the material it is cutting. This jam can occur when the saw blade is located at various positions of its cutting stroke. The worst case happens when the jam occurs when the saw blade is all the way out. In that case, the saw blade tries to retract into the saw, pulling the foot solidly up against the material and then the jams causes the saw mechanism to rapidly stop creating large stresses on its internal parts and sometimes causing component breakage or gear stripping. The isolation/absorber foot system provides a measure of jam protection because when saw tries to draw the foot up against the work piece, the isolator yields and acts as a cushion. The saw does come to a stop, but the isolator spreads the stop out over a longer distance, thereby reducing the shock load to the parts.

During normal operation of a reciprocating saw, the blade is stroked back and forth while sawing through wood or other material. This creates vibration and shock arising from several sources, the primary source of which comes from the unbalanced motion of the internal saw mechanism. While this can be almost totally eliminated if a counterweight is used in the mechanism, most saws currently sold do not contain a counterweight. Therefore, most of the vibration comes from the saw mechanism itself.

Another source of vibration and shock arises from the cutting process. The cutting forces cause the material being cut to vibrate and create shocks as the material fractures. Since the saw foot is drawn up against the material being cut, these vibrations are transmitted into the foot and through the saw into the user's hands. The vibrations of the material and the forces on the blade during the return stroke also act to cause the saw foot to be lifted away from contact with the material and then impact into the material on the next cut stroke thereby creating shock impulses which travel into the user's hands.

In order to reduce hand-arm vibration, both shock and vibration need to be dealt with. With regard to vibration isolation, the most predominant vibrations occur at the operating frequency of the saw-blade which is approximately 46 Hertz for many saws. According to vibration theory, an isolator with low stiffness, low damping and a low resonant frequency is preferable. The resonant frequency of the isolator is preferably about half of the forcing frequency in order to get reasonable isolation, it being understood that if the resonant frequency of the isolator is equal to the forcing frequency, then the vibration can actually be amplified.

Another consideration which compels the use of a stiffer isolator is the cutting rate of the tool. If a low stiffness isolator is used, then during the pull stroke (i.e., the cutting stroke), the foot will be pulled hard up against the work piece and the isolator will deflect under the cutting force. This causes lost motion to occur at the cutting blade and consequently the cutting rate will be adversely affected. Therefore, a sufficiently stiff isolator is preferred so that the foot does not compress under the cutting forces. However, a stiffer isolator has a higher resonant frequency and the forcing frequency becomes closer to the resonant frequency of the isolator.

In situations where isolators have some of the frequency content near isolator resonance or when the forcing frequency gets closer to the resonant frequency, it is necessary to have damping (energy absorption) in the isolator. While the damping reduces the isolation at other frequencies, near resonance it prevents amplification from taking place. With the embodiments of the present invention, the forcing frequency is closer than ideal to the resonant frequency of typical elastomer isolators, so damping is necessary. While damping reduces the overall isolation over the frequency spectrum, it has the benefit of improving the shock absorbing qualities of the isolator.

Isolation systems that have little damping are prone to post-shock resonant oscillation, higher post-shock peak acceleration and greater post-shock displacement. Since there is considerable shock loading from the foot impacting on the work piece and from the fracturing of the material, it is necessary to have good shock absorbing capability. So for several reasons, an isolator system with damping is preferred.

While exactly what stiffness and what damping that will be ideal for reciprocating saws is somewhat dependent upon what materials are being cut and variations in the type of blade being used, there are clear indications of what ranges of material properties are preferred. A range of isolator stiffness as determined by a range of elastomer hardness as measured on the Shore A hardness scale is used, as well as the damping qualities of the isolator material. The damping qualities are a function of the resilience of the material as measured according to Bashore Rebound Test-ASTM D2632. For the Bashore Rebound test, a weight is dropped onto the test specimen and how far it rebounds back up is measured. A perfectly elastic material has a rebound of 100% and a perfect absorber has a rebound of 0%. The material hardness of the embodiments of the present invention is in a range of 70-100 Shore A scale durometer units, and the resilience should be less than 50%. The isolator block could be any compressible substance that also possesses damping and hardness qualities described above.

Referring now to the drawings and particularly FIG. 1, a reciprocating saw, indicated generally at 20, is shown to have a housing 22 and a rear handle portion 24 with a trigger switch 26. The saw 20 has a front nose portion 28 from which an output shaft 30 extends, and to which a toolless blade connector 32 is attached, the latter holding a blade 34.

A preferred embodiment of the present invention is indicated generally at 40 and is an isolator foot system that is configured to be mounted to the nose end portion 28 of the saw, as is typical for such saws. Referring to FIGS. 1-6, which illustrate the first preferred embodiment, it has an elongated stem portion, indicated generally at 42, to which a front housing, indicated generally at 44, is attached and the housing 44 is attached to a foot pad, indicated generally at 46.

The stem portion 42 has an elongated stem 48 that has a relatively wide center portion 50 and transverse sides 52. It also has an elongated slot 54 having a number of spaced notches 56 which interact with a holding mechanism that is present in the saw nose portion. The notches 56 permit the elongated stem 48 to be adjusted so that the outer foot pad 46 can be positioned relative to the length of the blade, for example, to provide an appropriate depth of cut during operation. It should be understood that other configurations for such attachment may be provided.

The stem portion 42 also has a forward portion, indicated generally at 58, which has a transverse panel 60 that extends downwardly from the center portion 50, as well as side panels 62 that are best shown in FIGS. 5 and 6. The forward portion 58 has rear legs 66 that are secured to the respective sides 52 by spot weldments which are known to those of ordinary skill in the art. The configuration of the side panels 62 is shown to be made of approximately ⅛ inch thick steel stock that is convenient sized for stamping into desired shapes, which in the configuration shown in FIGS. 1-6 is used to make all of the components of the foot structure 40. Both of the side panels 62 have a lower, forwardly extending leg 68 which has an upper surface 70 for engaging the front housing 44 in a manner that will be hereinafter described.

The front housing 44 has side panels 72, as well as a transverse panel 74 that extends between the two side panels 72 and which is generally parallel to the transverse panel 60 of the stem portion 42. The front housing 44 is pivotally attached to the stem portion 42 by a pivot connection 76 which is preferably a bolt that extends from the side portions 72 through an aperture in the side panels 62 of the stem portion 42, but may be rivets or the like.

In the first preferred embodiment, the side panels 72 of the front housing has a protrusion 78 preferably stamped therefrom, with a bottom surface that engages the surface 70 of the forward leg 68 of the stem portion 42, as is best shown in FIG. 6. This limits the rotation of the front housing 44 relative to the stem portion 42 around the pivot connection 76 in the clockwise direction as shown in FIG. 6, which is important to the interaction of the front housing 44 relative to the stem portion in pre-compressing a compliant member, which is shown to be an elastomeric block, indicated generally at 80, in FIGS. 3, 4, 5 and 7.

It should be understood that the side panel structure 62, which may be may not include the transverse panel 60, may be formed as a singular casting, rather than stamping components from the relatively thin steel sheet stock. In this regard, the transverse panel 60 may be formed from a single piece of sheet stock that is used to form the center portion 50 and sides 52 of the stem portion, or the transverse panel 60 may be formed from sheet stock that is used to make the side panel 62 that is spot welded to the stem portion 42.

Figure 2:
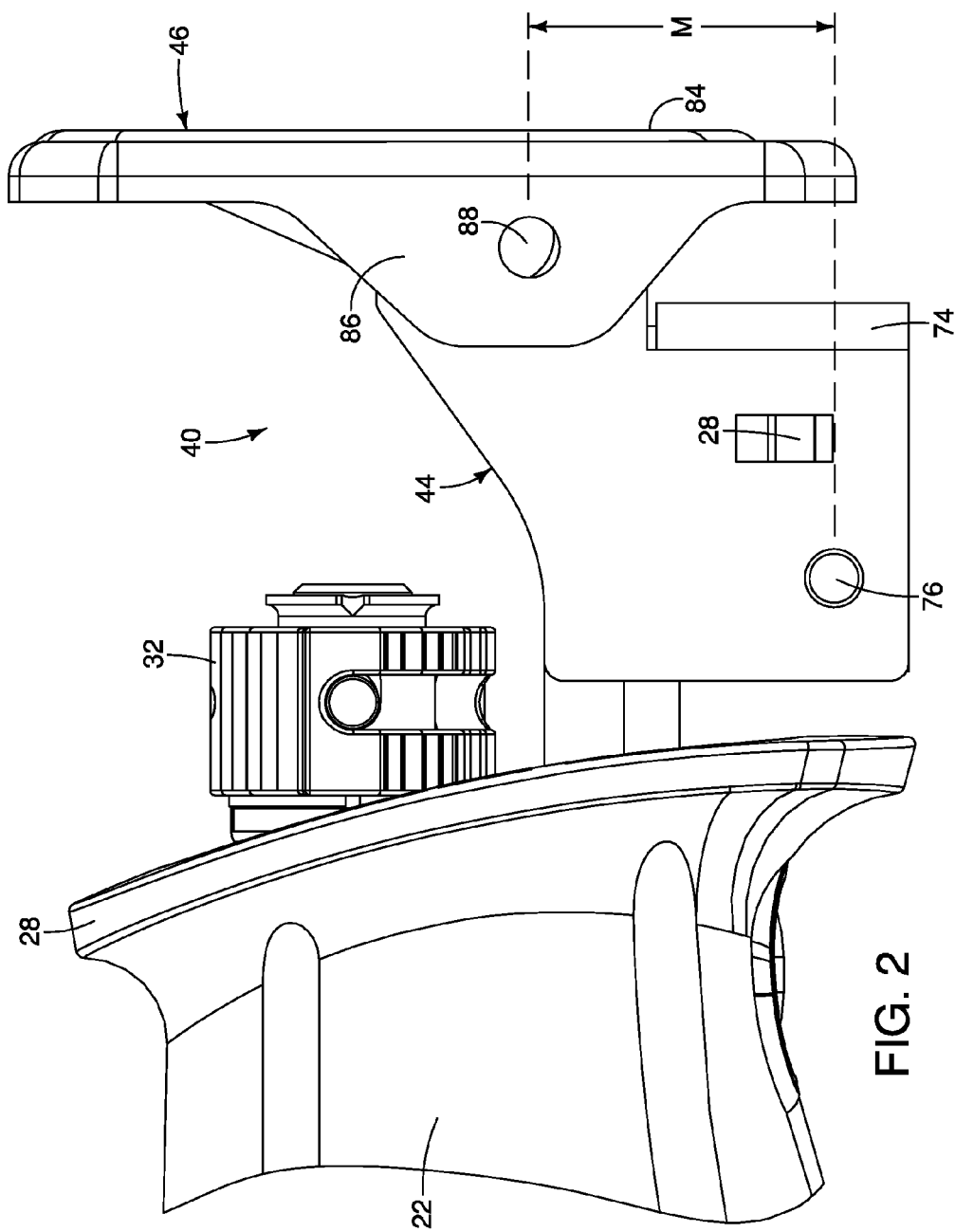
FIG. 2 is a side elevation of the isolation system shown together with a portion of the reciprocating saw shown in FIG. 1, with the blade removed.
Figure 3:
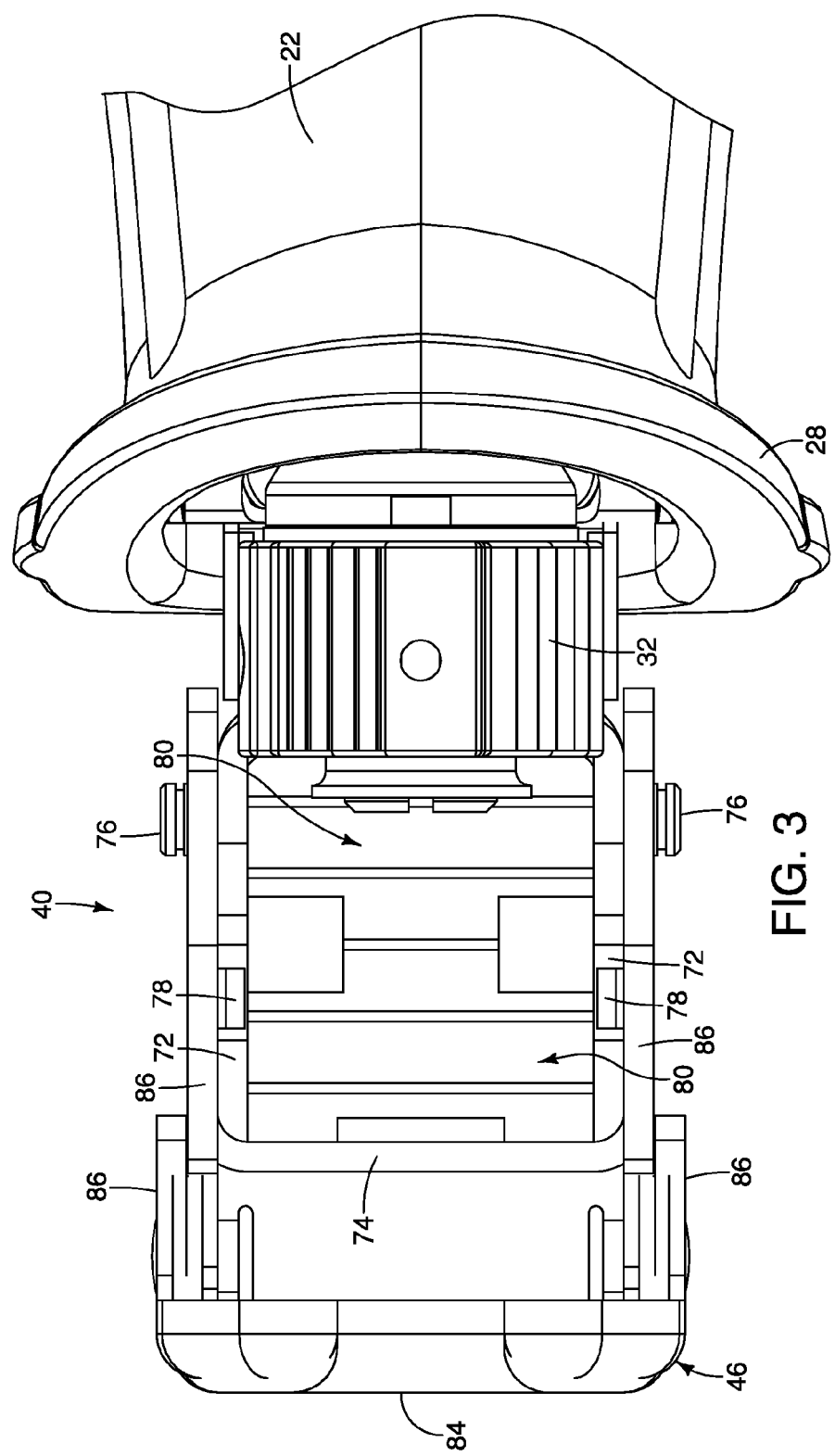
FIG. 3 is a top view of the isolation system shown in FIG. 2.
Figure 4:
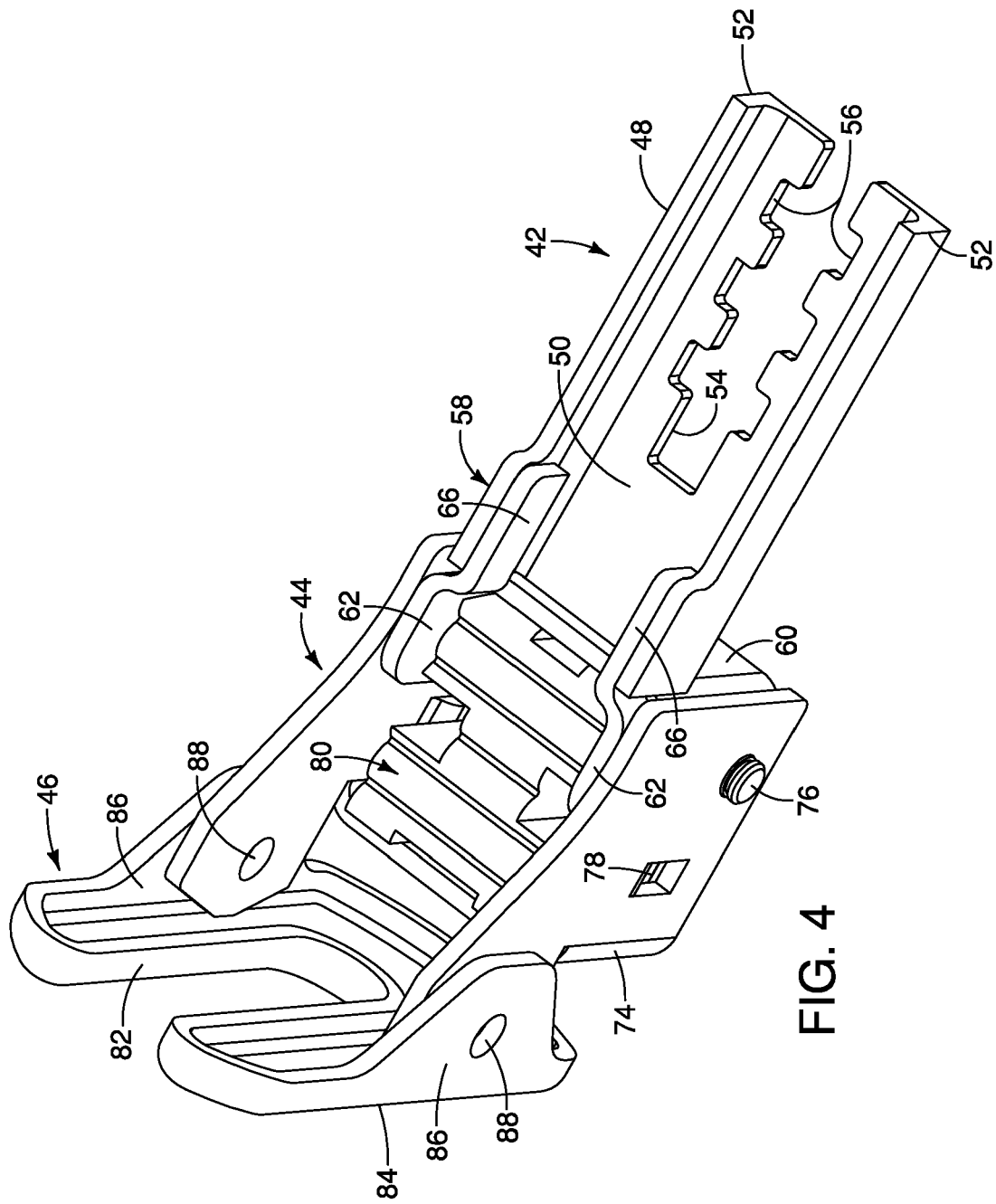
FIG. 4 is a perspective view of the embodiment shown in FIGS. 2 and 3.

The foot pad 46 includes a central opening 82 through which the blade 34 extends, and it has a front surface 84 which contacts the work piece contacts. The foot pad 46 has rearwardly extending sides 86 which have an aperture for connection to the front housing 44 by a pivot connection 88. While the various drawings show either an aperture or a rivet connection, it should be understood that the pivot connection is either a rivet or a bolt that extends between apertures in the side 86 of the footpad 46 as well as the side panels 72 of the front housing 44. As is typical, the foot pad 46 should be rotatable relative to the housing 44 about the pivot connection 88. As best shown in FIG. 2, the pivot connection 88 is offset relative to the pivot connection 76 to define a moment arm M. When a force is applied to the foot pad 46 in the leftward direction, it will cause the housing 44 to rotate around pivot connection 76 in the counterclockwise direction. This has the effect of further compressing the elastomeric block 80.

With regard to the elastomeric block 80 and referring to FIG. 7, it has a pair of side vertical cavities 90 that extend approximately ⅓ to ½ of the width W, as well as a front cavity 92 that has end surfaces 94 which are oriented along a dashed lines 96 to end surfaces 98 of each of the side cavities 90 as well as an opposite end cavity 100 which have end surfaces 102 that are closely aligned with the end surfaces 98 of the side cavities 90. When the elastomeric block 80 is pre-compressed, impulses that are imposed upon the block 80 during a cutting operation create shear forces in the material on opposite sides of the lines 96, which provide increased shock absorbing capability and provide increased damping when load is applied to the elastomeric block 80. This is known in the art as constrained layer dampening which provides increased shock absorbing capability during a cutting operation. The block 80 also has an aperture 104 which enables the throughput bolt 76 to be inserted. The overall configuration of the elastomeric block 80 has a length L, a width W and a height H, which are in the range of approximately 3.6 cm by 2.9 cm by 2.9 cm for reciprocating saws having a conventional length of approximately 48 cm.

Other embodiments will now be described which have many common components and which will carry reference numbers that are the same as the reference numbers that are described with regard to the embodiments shown in FIGS. 1-7, except that they will either carry a prime (') designation if slightly modified relative to the first preferred embodiment or an additional reference number to be described.

With regard to the embodiments shown in FIG. 8, it has an elastomeric block 80' which is a solid cuboid block and does not have the recesses 90, 92 and 100 as shown in the first preferred embodiment. Also in this embodiment, rather than having the protrusion 78 that is stamped from the side panels 72 of the front housing 44, it has a bolt 110 that extends through an aperture (not shown) in the block 80', which contacts the upper face 70 of the leg 68 of the stem portion, which is shown to be an integrally formed component with the transverse panel 60 formed in the stem portion. The bolt 110 may extend through the block 80' or may extend merely a sufficient distance so that it contacts the upper surface 70 of the leg 68. The position of the bolt 110 is determined to provide the necessary pre-compression of the block 80'.

Figure 11:
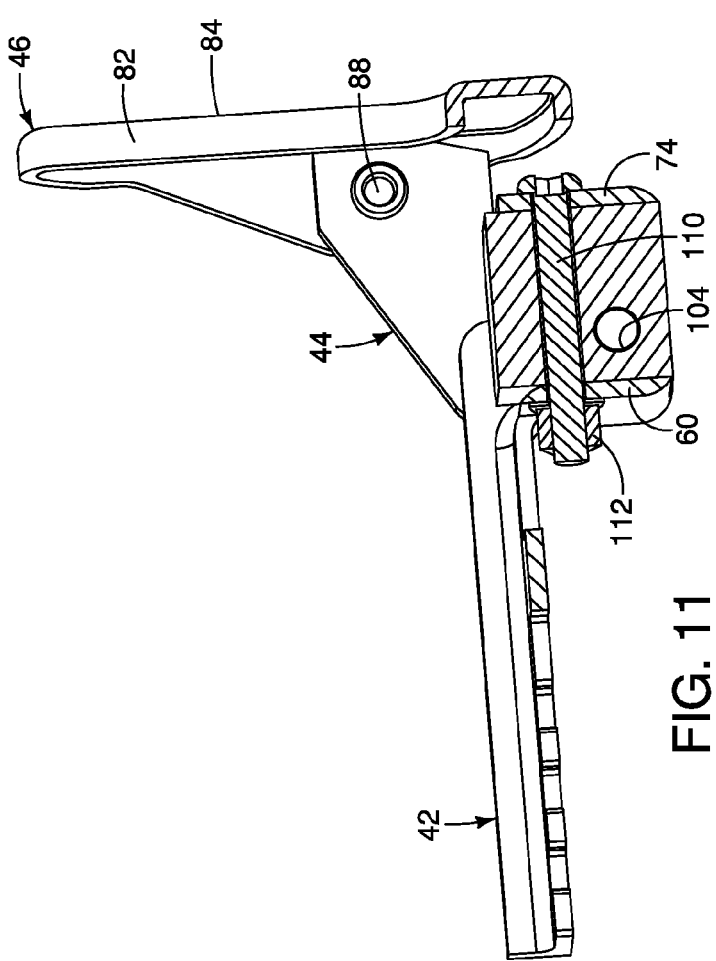
FIG. 11 is a cross-section of the embodiment shown in FIG. 10.

Another embodiment of the present invention is shown in FIGS. 10 and 11, wherein a bolt 110 having a threaded nut 112 attached thereto extends longitudinally (i.e., parallel to the length of the stem portion 42) and can be tightened to provide the necessary pre-compression that in the prior embodiments is provided by the position of the bolt 110 or the protrusion 78. A small wave spring under the bolt head or nut could be provided to act to reduce impacts when the foot is rapidly unloaded.

Figure 12:
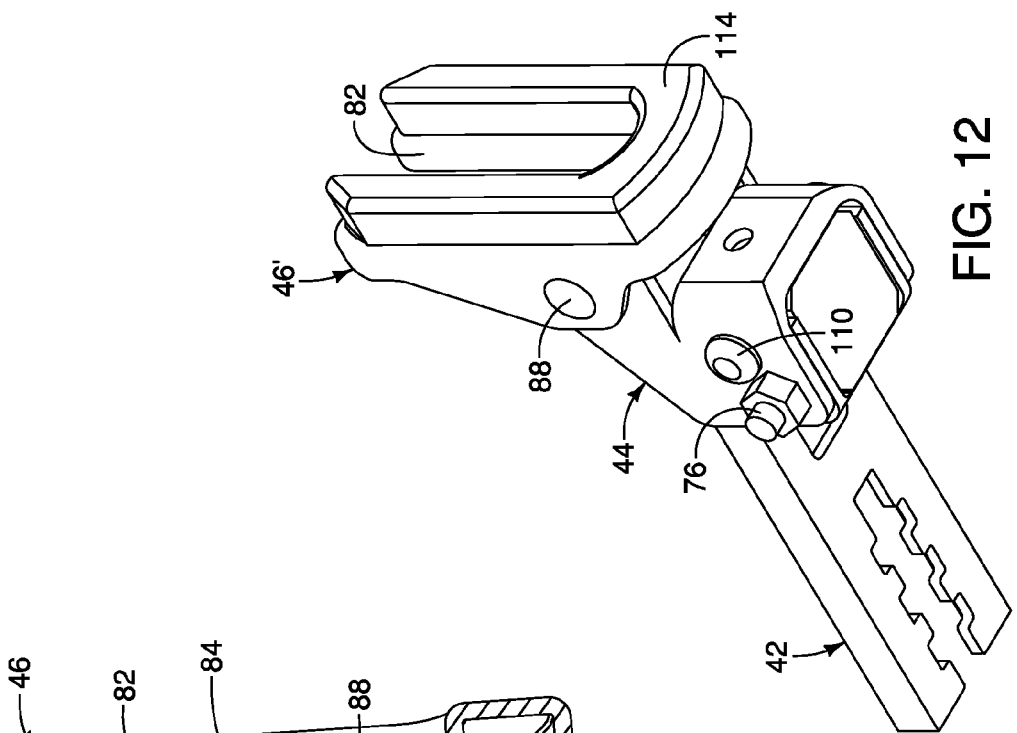
FIG. 12 is a perspective view of a fourth preferred embodiment of an isolation system.

In another preferred embodiment as shown in FIG. 12, a relatively thick neoprene coating or formation 114 is bonded to the front surface 84 of the foot pad 46' which provides shock absorption and damping during operation of the saw. It should be understood that shock absorbing materials other than neoprene may be used as desired.

Still other preferred embodiments are shown in FIGS. 13 and 14, which utilize one or more compression springs 116 that are interposed between the transverse panels 60 and 74 which provide shock absorbing and vibration damping capability, with the embodiments shown in FIG. 13 also incorporating internal damping devices 118. Other spring configurations such as leaf springs or the like may be used in place of the compression springs.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention.

Various features of the invention are set forth in the following claims.

What is claimed is:

1. A foot apparatus in combination with a power reciprocating saw having a nose portion configured to receive the same and an elongated reciprocating plunger configured to hold a cutting blade that extends outwardly beyond said apparatus, said apparatus comprising:
   an elongated foot stem configured to be inserted into the nose portion of the saw;
   a foot pad having a forward surface for contacting a work piece and having an opening through which a blade extends;
   a front housing having one end portion with a first pivot connection to said stem and an opposite end portion having a second pivot connection to said foot pad, said first and second pivot connections being offset from one another in a transverse direction relative to the longitudinal direction of the plunger to thereby define a moment arm;

a compliant element interposed between one of said foot pad and front housing and said stem configured to resist pivoting of said front housing relative to said stem and thereby isolate and dampen vibration and shock that is transmitted to said stem by reciprocating action of the plunger and by cutting of a work piece.

2. A foot apparatus as defined in claim 1 wherein said foot stem has an elongated portion configured for insertion into the nose portion of the saw and a front portion having a stem transverse panel and spaced apart stem side panels interconnecting said stem side panels, and said front housing having spaced apart housing side panels adjacent said stem side panels and a forward transverse panel interconnecting said housing side panels, said first pivot connection interconnecting said stem and housing side panels at a location adjacent to a bottom portion of said stem transverse panel.

3. A foot apparatus as defined in claim 2 wherein said compliant element comprises a block of an elastomeric material configured to fit within the volume defined by said stem front panel, said housing transverse panel and said stem and housing side panels.

4. A foot apparatus as defined in claim 3 wherein said elastomeric material has a material hardness in the range of about 70 to about 100 Shore A scale durometers and a resilience of less than about 50%.

5. A foot apparatus as defined in claim 3 wherein said block of elastomeric material has a generally cuboid shape sized to have a first end portion contacting said stem transverse panel and a second end portion contacting said housing forward transverse panel.

6. A foot apparatus as defined in claim 5 wherein said block has a height of at least approximately 3.6 cm, a width of at least approximately 2.9 cm and a length of at least approximately 2.9 cm.

7. A foot apparatus as defined in claim 5 wherein said block has at least one recess intermediate said first and second end portions.

8. A foot apparatus as defined in claim 7 wherein said block has a vertical recess on opposite sides thereof for creating shear forces during compression resulting from operation of the saw.

9. A foot apparatus as defined in claim 8 wherein the end surfaces of said first and second end portions have a vertical recess therein for creating shear forces during compression resulting from operation of the saw.

10. A foot apparatus as defined in claim 5 wherein said front housing is configured to precompress said block of elastomeric material when said foot apparatus is at rest.

11. A foot apparatus as defined in claim 10 wherein said front housing is pivoted about said first pivot connection a predetermined angular amount from a non-pivoted position so that said forward transverse panel compresses said block, at least one of said housing side panels having a protrusion that engages a surface of an adjacent stem side panel and prevents said front housing from returning to its non-pivoted position.

12. A foot apparatus as defined in claim 10 wherein said protrusion is an ear that is stamped from said side panels.

13. A foot apparatus as defined in claim 10 wherein said protrusion is a bolt mounted in said housing side panels that extends to contact an adjacent stem side panel.

14. A foot apparatus as defined in claim 10 wherein said front housing is pivoted about said first pivot connection a predetermined angular amount from an non-pivoted position so that said forward transverse panel compresses said block, said apparatus further comprising a bolt extending from said housing forward transverse panel to said stem transverse panel and a threaded nut that can be tightened to pivot said front housing and precompress said block and prevent said front housing from returning to its non-pivoted position.

15. A foot apparatus as defined in claim 1 wherein said compliant element comprises at least one compression spring configured to fit within the volume defined by said stem front panel, said housing transverse panel and said stem and housing side panels, said at least one compression spring being sized to have a first end portion contacting said stem transverse panel and a second end portion contacting said housing forward transverse panel.

16. A foot apparatus as defined in claim 15 wherein said compliant elements further comprises a dampening structure associated with at least one spring for dampening the operation of said spring.

17. A foot apparatus as defined in claim 1 wherein said first pivot connection comprises a through bolt.

18. A foot apparatus as defined in claim 1 wherein said first and second pivot connections comprises a rivet.

19. A foot apparatus as defined in claim 1 wherein at least the forward surface of said foot pad is provided with a thick urethane coating.

* * * * *